United States Patent
Venkataraman et al.

(10) Patent No.: US 12,510,365 B2
(45) Date of Patent: Dec. 30, 2025

(54) SYSTEM AND METHOD FOR DETERMINING AN INSTANTANEOUS ABSOLUTE POSITION AND ORIENTATION OF AN ENTITY IN A NAVIGATION SPACE

(71) Applicant: HACHIDORI ROBOTICS PRIVATE LIMITED, Bangalore (IN)

(72) Inventors: Ramanathan Venkataraman, Bangalore (IN); Janakiram Annam, Bangalore (IN)

(73) Assignee: HACHIDORI ROBOTICS PRIVATE LIMITED (IN)

( * ) Notice: Subject to any disclaimer, the term of this patent is extended or adjusted under 35 U.S.C. 154(b) by 405 days.

(21) Appl. No.: 18/252,322

(22) PCT Filed: Nov. 29, 2021

(86) PCT No.: PCT/IN2021/051116
§ 371 (c)(1),
(2) Date: May 15, 2023

(87) PCT Pub. No.: WO2022/118338
PCT Pub. Date: Jun. 9, 2022

(65) Prior Publication Data
US 2023/0417555 A1    Dec. 28, 2023

(30) Foreign Application Priority Data
Dec. 1, 2020 (IN) .............................. 202041052367

(51) Int. Cl.
*G01C 21/20* (2006.01)
*G01C 21/00* (2006.01)

(52) U.S. Cl.
CPC ......... *G01C 21/206* (2013.01); *G01C 21/005* (2013.01); *G01C 21/383* (2020.08); *G01C 21/3848* (2020.08); *G01C 21/3859* (2020.08)

(58) Field of Classification Search
CPC .. G01C 21/206; G01C 21/005; G01C 21/383; G01C 21/3848; G01C 21/3859
See application file for complete search history.

(56) References Cited

U.S. PATENT DOCUMENTS

2021/0156711 A1*  5/2021  Flade .................... G01C 25/00

FOREIGN PATENT DOCUMENTS

| EP | 2594899 A2 * | 5/2013 | ............ G06V 20/13 |
| TW | 201116805 A * | 5/2011 | ............ G01C 21/26 |

OTHER PUBLICATIONS

Gracias et al., "Mosaic-based navigation for autonomous underwater vehicles", Oct. 31, 2003, IEEE Jounal of Oceanic Engineering, vol. 28, issue 4, pp. 609-624 (Year: 2003).*

(Continued)

*Primary Examiner* — Mi'Schita' Henson
(74) *Attorney, Agent, or Firm* — GOUDIE,PLLC

(57) ABSTRACT

A method and system for determining a refined absolute position and refined absolute orientation of an entity in a navigation space is provided. The system includes a plurality of sensors, a coarse absolute position and orientation estimation unit to determine a coarse absolute position and/or a coarse absolute orientation, of entity based on a position data captured by sensors at predefined frequency/interval, a relative position and orientation estimation unit to determine a relative position and/or a relative orientation, of the entity based on a set of data captured from sensors, a navigation guidance unit to provide and update unique attributes of the navigation space, and an analytics unit to determine refined absolute position or refined absolute orientation of the entity by fine tuning: the coarse absolute position based on relative position and the coarse absolute orientation based on relative orientation using the navigation map.

10 Claims, 11 Drawing Sheets

(56) References Cited

OTHER PUBLICATIONS

English (machine) translation of description for TW-201116805-A, reference to Miksa Krzysztof (Year: 2011).*

* cited by examiner

SYSTEM AND METHOD FOR DETERMINING AN INSTANTANEOUS ABSOLUTE POSITION AND ORIENTATION OF AN ENTITY IN A NAVIGATION SPACE

CROSS-REFERENCE TO RELATED APPLICATIONS

This application is a national stage application of the Patent Cooperation Treaty (PCT) international stage application titled "SYSTEM AND METHOD FOR DETERMINING AN INSTANTANEOUS ABSOLUTE POSITION AND ORIENTATION OF AN ENTITY IN A NAVIGATION SPACE", numbered PCT/IN2021/051116, filed at World Intellectual Property Organization (WIPO) on Nov. 29, 2021. The aforementioned PCT international phase application claims priority from the Indian Utility Non-Provisional Patent Application (NPA) with serial number 202041052367 filed on 1 Dec. 2020 with the title "SYSTEM AND METHOD FOR DETERMINING AN INSTANTANEOUS ABSOLUTE POSITION AND ORIENTATION OF AN ENTITY IN A NAVIGATION SPACE." Also the patent application filed in India is granted with the Grant No. 408568. The contents of the abovementioned Non-provisional patent application and Pct application are included in entirety as reference herein.

BACKGROUND

Technical Field

The embodiments of the present invention are generally related to a position sensing and navigation system. The embodiments of the present invention are particularly related to a position sensing and navigation system for moving objects. The embodiments of the present invention are more particularly related to a method and system for determining an instantaneous absolute position and orientation, referred subsequently as refined absolute position and refined absolute orientation respectively in the document, of an entity such as robot (BOT) in a navigation space.

Description of the Related Art

Pursuant to an exemplary scenario, determining the position and rotational orientation of an object within a defined space is a practical problem that has brought about many solutions, each dedicated toward solving the specific requirements of an application. Several existing techniques for determining position or orientation of objects (stationary or mobile) within a given space include for example optical, ultrasonic, or radio-based techniques. However, most of the existing techniques do not provide angular orientation information and existing techniques that enable angular orientation measurement, lack positional determination. For example, several existing techniques employ a Global Positioning System (GPS) for position determination, but it lacks orientation determination capability for stationary objects and also GPS operability suffers indoors from signal attenuation and reflections, and accordingly is not a good choice for indoor applications. Magnetometers provide absolute orientation but are highly susceptible to dynamically changing magnetic field near the sensor. While they may work well in controlled scenario, for load carrying applications the magnetic nature of the load could make the readings unreliable. Ultrasonic methods operate well indoors but lack orientation determination. Additionally, the existing techniques such as the laser-based techniques (Lidar) offer both position and orientation but at a huge cost. Moreover, existing techniques that use position data associated with loosely fixed objects on the floor like furniture, machinery and the like as reference points are highly vulnerable to dynamically changing scenario on the floor.

Moreover, while navigating through narrow passages, it is critical to maintain the entity close to a pre-defined path (e.g. middle line of the passage) so as to avoid any collision or false interpretation of fixed structures like wall as obstructions. To maintain the entity along the pre-defined path, accurate knowledge of the position of the entity (such as for example, within few centimeters error) becomes an absolute necessity. In order to keep the entity in the ideal path, a current position and deviation from the ideal path of the entity needs to be accurately known with a desirable error of less than for example, 10 centimeters.

Hence there is a need for a cost-effective alternate method and system for determining absolute position and orientation of an entity while providing good accuracy along with an elimination of any dependency on a dynamically changing scenario in the navigation space except planned changes such as a change in the navigation path, modifying the layout like breaking a wall and the like. Further there is a need for a system and method to find an absolute position of an entity (hereafter called BOT), stationary or moving, in a 2D coordinate system (say, Cartesian) using a diversified set of data captured from different sourcing devices along with an assistance of a guiding entity (e.g. unique map) that provides the required guidance on the usage of the diversified set of data dynamically to arrive at a required absolute position accurately for a given navigation segment.

The above mentioned shortcomings, disadvantages and problems are addressed herein, which will be understood by reading and studying the following specification.

OBJECTIVES OF THE EMBODIMENTS

The prime object of the present invention is to provide a system and a method to determine a refined absolute position and refined absolute orientation of an entity in a navigation space in a cost-effective manner along with good accuracy while eliminating any dependency on any dynamically changing scenario or unplanned changes in the navigation space. With no reference to historical data, quality of the absolute position remains the same and does not degrade during any interval of time due to dependency on recency of old data.

Another object of the embodiment herein is to provide a system and a method to determine a refined absolute position and refined absolute orientation of an entity in a navigation space based on extraction of diversified features in the navigation space using diversified sensors used to seamlessly help improve accuracy of absolute position and orientation including on-the-fly switchovers.

Yet another objective of the embodiment herein is to provide a system and a method to determine a refined absolute position and refined absolute orientation of an entity in a navigation space that achieves accurate absolute position using coarse absolute position and a unique combination of relative positions extracted from diversified sensors using specific features in the navigation space.

Yet another objective of the embodiment herein is to provide a system and a method to determine a refined absolute position and refined absolute orientation of an entity in a navigation space using a seamless switch-over between sensors during navigation based on the context as supported by a unique navigation map.

These and other objects and advantages of the embodiments herein will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

The various embodiments herein provide a system and to determine an absolute position and absolute orientation of an entity in a navigation space in a cost-effective manner along with good accuracy while eliminating any dependency on any dynamically changing scenario or unplanned changes in the navigation space. With no reference to historical data, quality of the absolute position remains the same and does not degrade during any interval of time due to dependency on recency of old data.

According to one embodiment herein, a system for determining a refined absolute position and refined absolute orientation of an entity in a navigation space is disclosed. According to an embodiment of the present invention, the system includes a plurality of sensors including a first set of sensors disposed on a first plurality of locations on the entity, and wherein the first set of sensors are part of a cartesian coordinate system provided by a local positioning system formed using a technology such as, but not limited to, UWB, Bluetooth, Zig-bee, Ultrasound, others. According to an embodiment of the present invention, the system includes a second set of diversified sensors disposed on a second plurality of locations on the entity. The system also includes a coarse absolute position estimation unit configured to determine at least one of: a coarse absolute position and a coarse absolute orientation, of the entity based on a position data captured by the first set of sensors in a two-dimensional cartesian plane of the cartesian coordinate system at predetermined frequency/interval. The system further includes a relative position and orientation estimation unit configured to determine at least one of: a plurality of a relative position and a relative orientation, of the entity relative to a predetermined path based on a set of data captured from the second set of diversified sensors wherein the data captured represent one of a relative deviation and a relative inclination of the entity with respect to preset known fixed physical features in the navigation space. The system further includes a navigation guidance unit configured to provide unique attributes based on a desired navigable layout identified in the indoor navigation space and to update one or more of the attributes of a navigation map dynamically as a learning/feedback based on a historical navigation data. The system further includes an analytics unit configured to determine at least one of a refined absolute position and a refined absolute orientation of the entity by fine tuning the coarse absolute position and the coarse absolute orientation based on one or more of the plurality of inputs provided by the relative position and orientation estimation unit, coarse absolute position of the entity and the navigation map.

According to one embodiment herein, the analytics unit is configured to transform the predetermined path by rotating a navigation plane associated with the predetermined path by a rotation angle to align the predetermined path to become parallel to X-axis or Y-axis in the two-dimensional cartesian plane and to generate a transformed navigation plane, and wherein the coarse absolute position is also rotated through the same rotation angle to obtain a transformed coarse absolute position of the entity, and wherein by modifying/correcting the transformed coarse absolute position of the entity, based on one or more of the plurality of inputs from the relative position and orientation estimation unit, a transformed refined absolute position of the entity is obtained, and wherein the transformed coarse absolute position of the entity is corrected/modified by substituting a combination of a transformed ideal coordinate value of interest and one or more of the plurality of inputs from the relative position and orientation estimation unit, to either X or Y value of the transformed coarse absolute position coordinates of the entity depending up on the rotation applied during transformation of the plane, and wherein the transformed ideal coordinate value of interest is equal to a transformed ideal starting point coordinate value selected based on the transformation applied, and wherein the ideal starting point coordinate is the coordinate of the starting node in the line segment obtained from the navigation map, and wherein the refined absolute position of the entity is obtained by rotating back the navigation plane in the reverse direction, through the same rotation angle, to the original orientation of the navigation plane, and wherein the transformed refined absolute position rotates by the same angle to provide the refined absolute position of the entity.

According to one embodiment herein, the refined absolute orientation of the entity is derived based on 1) the relative orientation of the entity obtained from the relative position and orientation estimation unit and 2) the coarse absolute orientation obtained from the coarse absolute position and orientation estimation unit, wherein in the transformed navigation plane, the relative position and orientation estimation unit provides the relative orientation of the entity with respect to the transformed path which is either parallel to one of X-axis or Y-axis based on the transformation applied, wherein a transformed absolute orientation of the entity in the transformed navigation plane is derived by adding the relative orientation of the entity along with its sign to the absolute orientation of the transformed path, as the absolute orientation of the transformed path is the same as one of X-axis or Y-axis, and wherein by rotating the transformed navigation plane in the reverse direction by the same quantity as the rotation angle, the transformed absolute orientation angle undergoes similar rotation and provides an interim representation of the absolute orientation of the entity, wherein the refined absolute orientation of the entity is obtained as a weighted combination of the coarse absolute orientation and the interim representation of the absolute orientation of the entity According to one embodiment herein, the analytics unit is configured to select and use one or more of the relative positions and the relative orientations from the relative position and orientation estimation unit from among a plurality of inputs. Such plurality of inputs to the analytics unit is derived by the relative position and orientation estimation unit using the diversified set of sensors among the second set of sensors. The choice of the specific inputs to be used is guided by the unique attributes provided by the navigation guidance unit based on the coarse absolute position.

According to one embodiment herein, the analytics unit is configured to seamlessly select and use one or more of the relative positions and the relative orientations from the relative position and orientation estimation unit from among a plurality of inputs while navigating through different sections of a navigation layout involving either a plurality of line segments or a single line segment with varying physical attributes, wherein the selection is guided by the navigation guidance unit based on the coarse absolute position of the entity wherein the navigation guidance unit provides the physical attributes associated with each such line segment like, for example but not limited to, a wall adjacent to the navigation path along with its side, presence of lane marking and others.

According to one embodiment herein, the first plurality of locations on the entity comprises a front end and a rear end of the entity and the second plurality of locations comprises at least one of: a left side of the entity, a right side of the entity, a front end of the entity, and a back end of the entity.

According to one embodiment herein, a method of navigating an entity along a predetermined path in a navigation space is disclosed. The method includes 1) initiating navigation of the entity along the predetermined path in the navigation space, 2) determining at least one of: a coarse absolute position and a coarse orientation of the entity based on a position data captured at predefined frequency/interval by a first set of sensors from among a plurality of sensors, disposed on a first plurality of locations on the entity, 3) determining at least one of: a relative position and a relative orientation, of the entity with respect to the predetermined path based on a set of data captured from a second set of diversified sensors from among the plurality of sensors, disposed on a second plurality of locations on the entity, 4) selecting at least one of: a relative position and relative orientation of the entity with respect to the predetermined path from among the plurality of relative position and relative orientation based on the coarse absolute position and the navigation map 5) determining a refined absolute position and a refined absolute orientation of the entity by fine tuning: the coarse absolute position based on relative position and the coarse absolute orientation based on relative orientation, using the navigation map, wherein the navigation map is generated and updated based on a map data and a machine learning model based on a historical navigation data. 6) Continuing steps 2 to 5 until the destination is reached.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments of the present invention will be better understood from the following detailed description with reference to the drawings, in which.

DETAILED DESCRIPTION OF THE EMBODIMENTS

Figure 1:
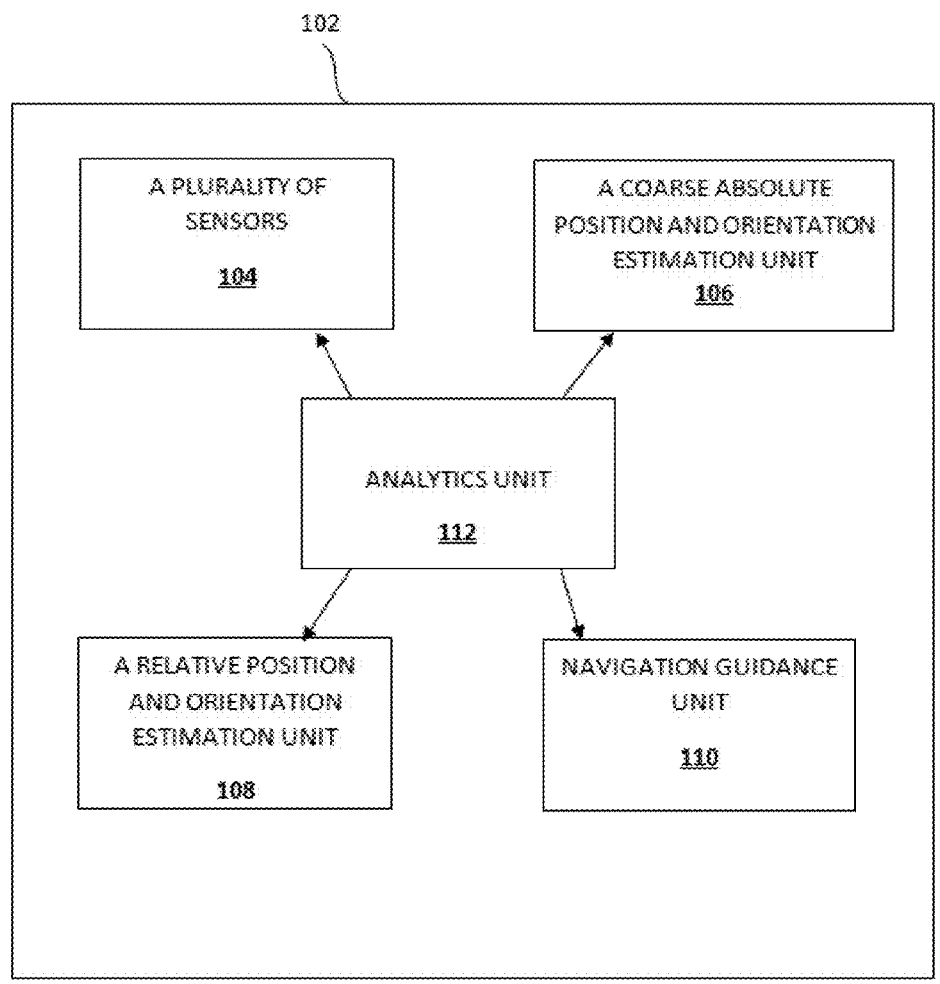
FIG. 1 illustrates a block diagram of a system for determining a position and an orientation of an entity in a navigation space, according to an embodiment herein.

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The various embodiments herein provide a system and method to determine a refined absolute position and a refined absolute orientation of an entity in a navigation space in a cost-effective manner along with good accuracy while eliminating any dependency on any dynamically changing scenario or unplanned changes in the navigation space. With no reference to historical data, quality of the absolute position and orientation remains the same and does not degrade during any interval of time due to dependency on recency of old data.

According to one embodiment herein, a system for determining a refined absolute position and a refined absolute orientation of an entity in a navigation space is disclosed. According to an embodiment of the present invention, the system includes a plurality of sensors including a first set of sensors disposed on a first plurality of locations on the entity, wherein the first set of sensors are part of a cartesian coordinate system provided by a local positioning system formed using a technology such as, but not limited to, UWB, Bluetooth, Zig-bee, Ultrasound, others. According to another embodiment of the present invention, second set of sensors disposed on a second plurality of locations on the entity. The system also includes a coarse absolute position and orientation estimation unit configured to determine at least one of: a coarse absolute position and a coarse absolute orientation, of the entity based on a position data captured in a two-dimensional cartesian plane of the cartesian coordinate system at predetermined frequency/interval by the first set of sensors. The system further includes a relative position and orientation estimation unit configured to determine at least one of: a relative position and a relative orientation, of the entity relative to the predetermined path based on a set of data captured at a predetermined frequency/interval from the second set of diversified sensors. The system further includes a navigation guidance unit configured to provide unique attributes based on a desired navigable layout identified in the indoor navigation space and to update one or more of the attributes dynamically as a learning/feedback based on a historical navigation data. The system further includes an analytics unit configured to determine at least one of a refined absolute position and a refined absolute orientation of the entity at a predetermined frequency/interval by fine tuning: the coarse absolute position and the coarse absolute orientation based on 1) one or more of the plurality of inputs provided by the relative position and orientation estimation unit, 2) coarse absolute position of the entity and 3) the unique attributes provided by the navigation guidance unit.

According to one embodiment herein, the analytics unit is configured to transform the predetermined path by rotating a navigation plane associated with the predetermined path by a rotation angle to align the predetermined path to become parallel to X-axis or Y-axis in the two-dimensional cartesian plane and to generate a transformed navigation plane, and wherein the coarse absolute position is also rotated through the same rotation angle to obtain a transformed coarse absolute position of the entity, and wherein by modifying/correcting the transformed coarse absolute position of the entity, based on one or more of the plurality of inputs from the relative position and orientation estimation unit, a transformed refined absolute position of the entity is obtained, and wherein the transformed coarse absolute position of the entity is corrected/modified by substituting a combination of a transformed ideal coordinate value of interest and one or more of the plurality of inputs from the relative position and orientation estimation unit, to either X or Y value of the transformed coarse absolute position coordinates of the entity depending up on the rotation applied during transformation of the plane, and wherein the transformed ideal coordinate value of interest is equal to a transformed ideal starting point coordinate value selected based on the transformation applied, and wherein the ideal starting point coordinate is the coordinate of the starting node in the line segment obtained from the navigation map, and wherein the refined absolute position of the entity is obtained by rotating back the navigation plane in the reverse direction, through the same rotation angle, to the original orientation of the navigation plane, and wherein the transformed refined absolute position rotates by the same angle to provide the refined absolute position of the entity.

According to one embodiment herein, the refined absolute orientation of the entity is derived based on 1) the relative orientation of the entity obtained from the relative position and orientation estimation unit and 2) the coarse absolute orientation obtained from the coarse absolute position and orientation estimation unit, wherein in the transformed navigation plane the relative position and orientation estimation unit provides the relative orientation of the entity with respect to the transformed path which is either parallel to one of X-axis or Y-axis based on the transformation applied, wherein as the absolute orientation of the transformed path is the same as one of X-axis or Y-axis, a transformed absolute orientation of the entity in the transformed navigation plane is derived by adding the relative orientation of the entity along with its sign to the absolute orientation of the transformed path, wherein by rotating the transformed navigation plane in the reverse direction by the same quantity as the rotation angle, the transformed absolute orientation angle undergoes similar rotation and provides an interim representation of the absolute orientation of the entity, wherein the refined absolute orientation of the entity is obtained as a weighted combination of the coarse absolute orientation and the interim representation of the absolute orientation of the entity.

According to one embodiment herein, the analytics unit is configured to select and use one or more of the relative positions and the relative orientations from the relative position and orientation estimation unit from among a plurality of inputs. Such plurality of inputs to the analytics unit is derived by the relative position and orientation estimation unit using the diversified set of sensors among the second set of sensors. The choice of the specific inputs to be used is guided by the navigation map based on the coarse absolute position.

According to one embodiment herein, the analytics unit is configured to seamlessly select and use one or more of the relative positions and the relative orientations from the relative position and orientation estimation unit from among a plurality of inputs while navigating through different sections of a navigation layout involving either a plurality of line segments or a single line segment with varying physical attributes, wherein the selection is guided by the navigation map based on the coarse absolute position of the entity wherein the navigation map provides the physical attributes associated with each such line segment like, for example but not limited to, a wall adjacent to the navigation path along with its side, presence of lane marking and others.

According to one embodiment herein, the first plurality of locations on the entity comprises a front end and a rear end of the entity and the second plurality of locations comprises at least one of: a left side of the entity, a right side of the entity, a front end of the entity, and a back end of the entity.

According to one embodiment herein, a method of navigating an entity along a predetermined path in a navigation space is disclosed. The method includes 1) initiating navigation of the entity along the predetermined path in the navigation space, 2) determining at least one of: a coarse absolute position and a coarse orientation of the entity based on a position data captured at predetermined frequency/interval by a first set of sensors from among a plurality of sensors, disposed on a first plurality of locations on the entity, 3) determining at least one of: a relative position and a relative orientation, of the entity with respect to the predetermined path based on a set of data captured from a second set of diversified sensors from among the plurality of sensors, disposed on a second plurality of locations on the entity, 4) selecting at least one of: a relative position and relative orientation of the entity with respect to the predetermined path from among the plurality of relative position and relative orientation based on the coarse absolute position and a navigation map 5) determining a refined absolute position and a refined absolute orientation of the entity by fine tuning: the coarse absolute position based on relative position and the coarse absolute orientation based on relative orientation, using the navigation map, wherein the instantaneous map is generated based on a map data and a machine learning model based on a historical navigation data. 6) Continuing steps 2 to 5 until the destination is reached.

The various embodiments disclosed herein provide a method and a system for determining a refined absolute position and orientation of an entity in a navigation space is provided. The system and method disclosed herein determine a refined absolute position and a refined absolute orientation of an entity in a navigation space based on extraction of diversified features in the navigation space using diversified sensors used to seamlessly help improve accuracy of absolute position including on-the-fly switchovers. Also, the system and method disclosed herein achieves accurate absolute position using coarse absolute position and a unique combination of relative positions extracted from diversified sensors using specific features in the navigation space. The entity can include a stationary object or a mobile object.

FIG. 1 illustrates a block diagram of a system for determining a position and an orientation of an entity in a navigation space, according to one embodiment herein. As depicted in FIG. 1, the system 102 includes a plurality of sensors 104, a coarse absolute position and orientation estimation unit 106, a relative position and orientation estimation unit 108, a navigation guidance unit 110, and an analytics unit 112. The entity may include for example, a stationary object or a mobile object (such as for example, a mobile factory equipment or vehicle). The navigation space includes an enclosed space or an open space with predefined boundaries, such as for example, a space inside a factory unit. According to one embodiment herein, the plurality of sensors includes a first set of sensors disposed on a first plurality of locations on the entity and a second set of sensors disposed on a second plurality of locations on the entity. The second plurality of sensors may include, for example, but not limited to, proximity sensing devices, image capture devices etc.

Figure 2A:
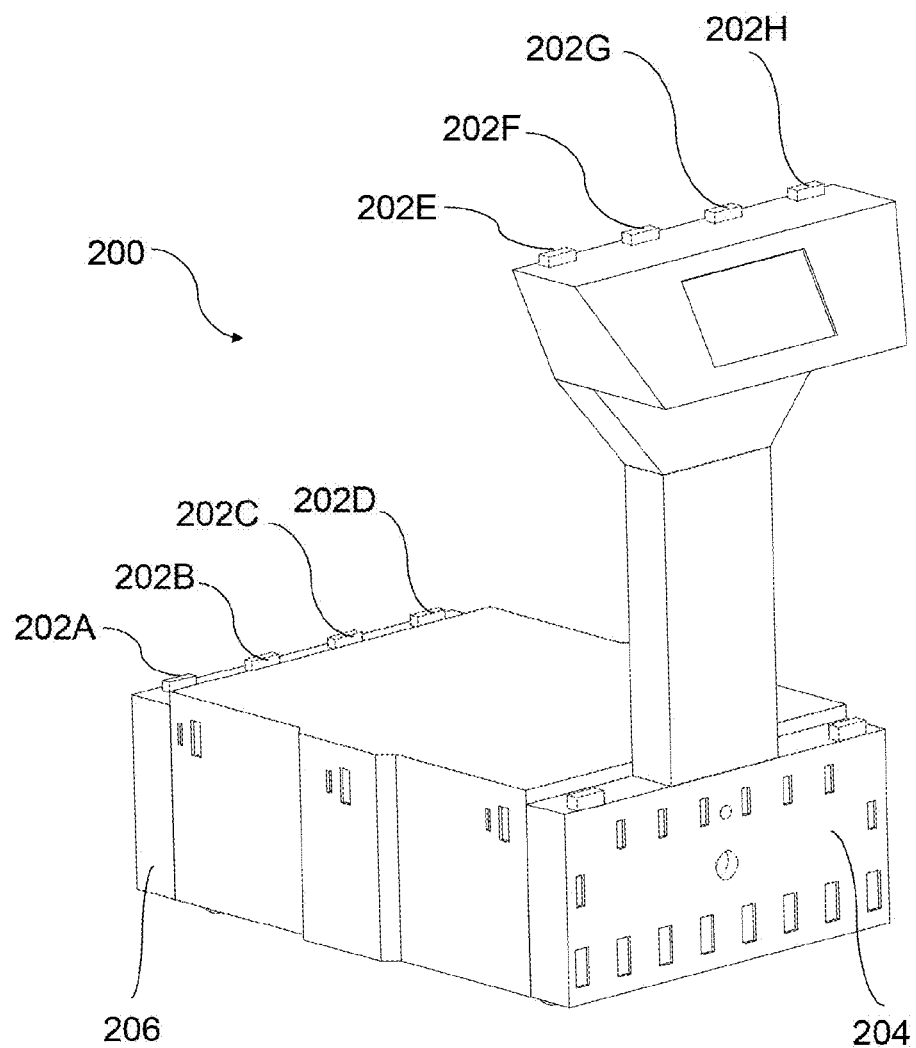
FIG. 2A illustrates a perspective view of an entity (robot) fitted with a system provided for determining a position and an orientation of an entity in a navigation space and fixed with a first set of sensors at the first plurality of locations on the entity, according to one embodiment herein.
Figure 2B:
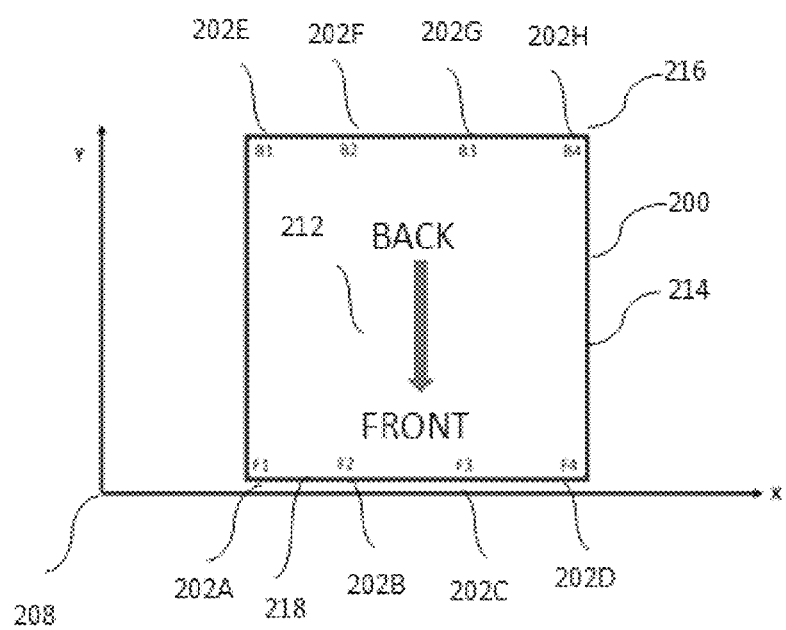
FIG. 2B illustrates a plan view of positioning of the first set of sensors at the first plurality of locations on the entity fixed with a system provided for determining a coarse absolute position and a coarse absolute orientation of an entity in a navigation space, according to one embodiment herein.

According to one embodiment herein, the coarse absolute position and orientation estimation unit 106 is configured to determine at least one of: a coarse absolute position and a coarse absolute orientation, of the entity based on a position data captured at predetermined frequency/interval by the first set of sensors (explained further along with FIGS. 2A-2B). The predetermined path includes an ideal navigation path for the entity within the navigation space. According to one embodiment herein, the relative position and orientation estimation unit 108 is configured to determine at least one of: a relative position and a relative orientation, of the entity relative to the predetermined path based on a set of data captured at predetermined frequency/interval from the second set of diversified sensors (explained further along with FIGS. 3A-3C).

According to one embodiment herein, the navigation guidance unit 110 is configured to provide unique attributes based on a desired navigable layout identified in the indoor navigation space and to update one or more of the attributes dynamically as a learning/feedback based on a historical navigation data. According to one embodiment herein, the navigation guidance unit 110 includes a centralized/local system or a device that contains unique pre-defined attributes for every line segment of a virtual map created for the navigation space (e.g. factory floor). The unique pre-defined attributes include, but is not limited to nodes, destination points, absolute coordinates of nodes and other attributes, valid paths connecting each node with every other node, an optimal route between nodes, an associated cost and intermediate transition angles, an augmentation for each line segment such as an ideal path for the segment, presence/usability of a wall on either side of the passage with sub-section granularity capturing possible gaps when wall is not present, presence of lane lines on either side of the line segment, a lane width, a maximum speed to travel based on lane width and any other consideration, an orientation angle offset at each node and the like.

According to one embodiment herein, the navigation guidance unit 110, generates an initial map using initial set of input data such as for example node coordinates, valid paths, path width, and the like. The initial set of input data is processed to arrive at a robust map in a unique way that pretty much has every attribute required to perform successful navigation from the very first run without any specific training need for the entity 200. For subsequent refinements/dynamic update of attributes like node orientation angle offset, presence of a wall or fixed structure along path, reliability of a lane marking on the floor for a given segment and the like. The navigation guidance unit 110, gathers/collects various data from the entity during navigation and applies machine learning (ML) techniques for further inference. According to an embodiment of the present invention, the dynamic map generation unit 110, uses the data inferred based on ML collected based on the experience of various entities and further applies artificial intelligence techniques and refines the attributes updates the initial map. Subsequently, the updated map is made available from very next navigation for all entities in the navigation space.

According to one embodiment herein—the analytics unit 112 is configured to determine at least one of a refined absolute position and a refined absolute orientation of the entity at a predetermined frequency/interval by fine tuning: the coarse absolute position and the coarse absolute orientation based on 1) one or more of the plurality of inputs provided by the relative position and orientation estimation unit (108), 2) coarse absolute position of the entity and 3) unique attributes provided by the navigation guidance unit (110). According to one embodiment herein, the analytics unit 112 is configured to transform the predetermined path 304 by rotating a navigation plane 402 associated with the predetermined path by a rotation angle so as to align the predetermined path parallel to one of X-axis or Y-axis of the two-dimensional cartesian plane to generate a transformed navigation plane 404 wherein the coarse absolute position as well undergoing the same rotation to become transformed coarse absolute position of the entity. According to one embodiment herein, the analytics unit 112 is configured to apply a refinement to the transformed absolute position based on one or more of the plurality of inputs from the relative position and orientation estimation unit to obtain a transformed refined absolute position of the entity on the transformed navigation, wherein the refinement is a simple substitution of a combination of a transformed ideal coordinate value of interest and one or more of the plurality of deviations from the predetermined path from among the plurality of inputs from the relative position and orientation estimation unit, to either X or Y value of the transformed coarse absolute position coordinates of the entity depending up on the rotation applied during transformation of the plane, wherein the transformed ideal coordinate value of interest is the same as one of the transformed ideal starting point coordinate values selected based on the transformation applied, wherein the ideal starting point is the theoretical coordinates for the starting node in the line segment obtained from the navigation map. According to one embodiment herein, the analytics unit 112 is configured to obtain a refined absolute position of the entity by rotating the navigation plane in the reverse direction by same quantity as the rotation angle back to the original orientation of the navigation plane 402, wherein the transformed refined absolute position rotates by the same angle to provide the refined absolute position of the entity. (explained further along with FIGS. 4A-4B).

According to one embodiment herein, the analytics unit 112 derives the refined absolute orientation of the entity based on 1) the relative orientation of the entity obtained from the relative position and orientation estimation unit 108 and 2) the coarse absolute orientation obtained from the coarse absolute position and orientation estimation unit 106, wherein in the transformed navigation plane the relative position and orientation estimation unit 108 provides the relative orientation of the entity with respect to the transformed path which is either parallel to one of X-axis or Y-axis based on the transformation applied, wherein as the absolute orientation of the transformed path is the same as one of X-axis or Y-axis, a transformed absolute orientation of the entity in the transformed navigation plane is derived by adding the relative orientation of the entity along with its sign to the absolute orientation of the transformed path, wherein by rotating the transformed navigation plane 404 in the reverse direction by the same quantity as the rotation angle, the transformed absolute orientation angle undergoes similar rotation and provides an interim representation of the absolute orientation of the entity, wherein the refined absolute orientation of the entity is obtained as a weighted combination of the coarse absolute orientation and the interim representation of the absolute orientation of the entity. (explained further along with FIGS. 3C, 4A-4B and 8). According to an embodiment of the present invention, the analytics unit 112 is configured to select and use one or more of the relative positions and the relative orientations from the relative position and orientation estimation unit 108 from among a plurality of inputs, wherein such plurality of inputs to the analytics unit 112 is derived by the relative position and orientation estimation unit 108 using the diversified set of sensors among the second set of sensors. The choice of the specific inputs to be used is guided by the navigation map based on the coarse absolute position. According to one embodiment herein, the analytics unit 112 is configured to seamlessly select and use one or more of the relative position and the relative orientation from among the plurality of inputs while navigating through different sections of a navigation layout involving either a plurality of line segments or a single line segment with varying physical attributes, wherein the selection is guided by the navigation map based on the coarse absolute position of the entity wherein the navigation map provides the physical attributes associated with each such line segment like, for example but not limited to, a wall adjacent to the navigation path along with its side, presence of lane marking and others (explained further along with FIG. 6).

FIGS. 2A-2B exemplarily illustrates positioning of the first set of sensors at the first plurality of locations on an example entity, according to one embodiment herein. As depicted in FIG. 2A the example entity 200 includes a front end 206 and a rear end 204. The first set of sensors 202A-H includes a rear set of sensors 202E-H disposed on the rear end 204 and a front set of sensors 202 A-D disposed on the front end 206, of the example entity 102. FIG. 2B depicts a representation of positioning of the first set of sensors 202A-H on the example entity 200 in an X-Y plane 208. As depicted in FIG. 2B the points B1 to B4 and the points F1 to F4 represent the positioning of the sensors 202E-H and 202A-D respectively. The first set of sensors 202A-H are positioned in a manner to achieve a three-dimensional spatial diversity. The first set of sensors 202A-H capture an absolute position of the example entity and the absolute position provided by each sensor is used to calculate a redundant set of absolute orientation representations and an average of the absolute orientation representations is used to determine an absolute orientation of the entity in the XY plane 208.

According to one embodiment herein, the position of the entity (such as example entity 200) as captured by the first plurality of sensors (such as the first plurality of sensors 202A-H) is used to determine at least one of a coarse absolute position and/or a coarse absolute orientation. According to one embodiment herein, the coarse absolute position and orientation estimation unit 106 determines of the lines B1F1 212 & B4F4 214 as depicted in FIG. 2B. The lines B1F1 212 & B4F4 214, from back to front provide a representation of the angle that the entity is facing at any given instance with respect to the predetermined path. The coarse absolute position and orientation estimation unit 106 determines the angle of the lines B1B4 216 and F1F4 218. The lines B1B4 216 and F1F4 218 provide an angle that is 90 degrees higher than the angle of the entity. The absolute position unit 106 combines the angles to get a Quad_Sensor_Angle. The Quad_Sensor_Angle is given by equation (1):

$$\text{Quad\_Sensor\_Angle} = ((\angle B1F1 + \angle B4F4 + (\angle B1B4 - 90) + (\angle F1F4 - 90))/4 \quad (1)$$

According to one embodiment herein, the coarse absolute position and orientation estimation unit 106 determines a first centre point (BC) using the points B1B2B3B4. The BC is given by equation (2):

$$BC = (B1 + B2 + B3 + B4)/4 \quad (2)$$

According to one embodiment herein, the coarse absolute position and orientation estimation unit 106 determines a second centre point (FC) using the points B1B2B3B4. FC is given by equation (3):

$$FC = (F1 + F2 + F3 + F4)/4 \quad (3)$$

The coarse absolute position and orientation estimation unit 106 determines an angle (Centre_Of_Sensors_Angle) representing the line BCFC given by equation (3):

$$\text{Centre\_Of\_Sensors\_Angle} = \angle BCFC \quad (4)$$

According to one embodiment herein, the coarse absolute position and orientation estimation unit 106 determines an angle representing the line B1F4 and an angle representing the line B4F1. Although the lines B1F4 and B4F1 have an offset with respect to the orientation of the entity, as the first set of sensors 202A-H are positioned in a rectangular fashion, the offset gets negated. For example, as depicted in FIG. 2B an actual orientation of the entity is 270 degrees. Suppose B1F4 is at an angle 300 degrees, then B4F1 would be at 240 degrees. Accordingly, a sum of the angle of B1F4 and angle of B4F1 gives a representation of instantaneous orientation (Big_Diagonal_Angle) of the entity given by equation (5):

$$\text{Big\_Diagonal\_Angle} = (\angle B1F4 + \angle B4F1)/2 \quad (5)$$

According to one embodiment herein, the coarse absolute position and orientation estimation unit 106 determines uses the points BC and FC identified in Centre_Of_Sensors_Angle. The coarse absolute position and orientation estimation unit 106 determines angles representing BCF1 & BCF4 and determines an average of the angles to obtain an angle SD_Angle_1. The coarse absolute position and orientation estimation unit 106 determines angles representing B1FC & B4FC and an average of the angles to get an angle SD_Angle_2. The coarse absolute position and orientation estimation unit 106 determines a Small_Diagonal_Angle by averaging SD_Angle_1 and SD_Angle_2 given by equation (6):

$$\text{Small\_Diagonal\_Angle} = ((\angle BCF1 + \angle BCF4)/2 + (\angle B1FC + \angle B4FC)/2)/2 \quad (6)$$

According to one embodiment herein, the coarse absolute position and orientation estimation unit 106 determines a coarse absolute orientation of the entity given by equation (7):

$$\text{coarse absolute orientation} = \\ (K1^*\text{Quad\_Sensor\_Angle} + \\ K2^*\text{Centre\_Of\_Sensors\_Angle} + \\ K3^*\text{Big\_Diagonal\_Angle} + \\ K4^*\text{Small\_Diagonal\_Angle})/(K1+K2+K3+K4) \quad (7)$$

where K1, K2, K3 and K4 are multiplication constants arrived based on a confidence level of each angle representation.

Figure 3A:
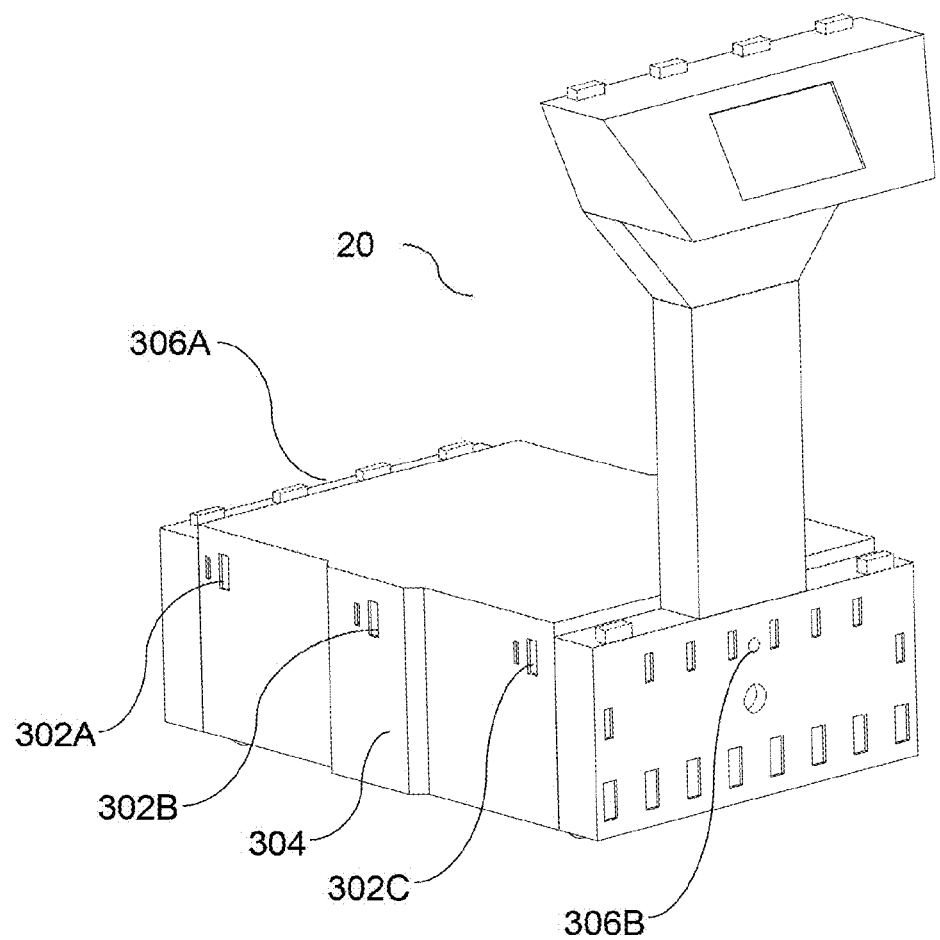
FIG. 3A illustrates a perspective view of an entity (robot) fitted with a system provided for determining a position and an orientation of an entity in a navigation space and fixed with a second set of sensors at the second plurality of locations on an example entity, according to one embodiment herein.
Figure 3B:
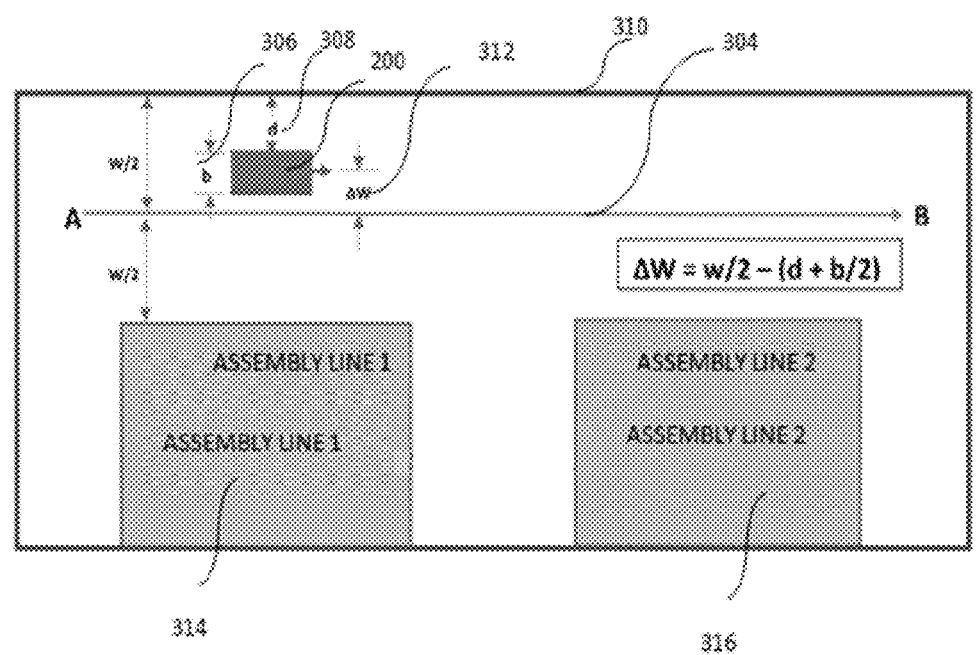
FIG. 3B illustrates a process of determining a deviation of the entity from a predetermined path during navigation in the navigation space derived by the relative position and orientation unit using the diversified set of sensors among the second set of sensors, according to one embodiment herein.

FIGS. 3A-3B exemplarily illustrates positioning of second set of sensors at the second plurality of locations on an example entity, according to one embodiment herein. As depicted in FIG. 3A the second set of sensors 302A-C are positioned along a left-side surface 304 of the example entity 200. The second set of sensors 302A-C can also be positioned along a right-side surface of the example entity 200 (not shown). The second set of sensors 302A-C provide a measure of a distance (d) of the entity from side walls or a fixed structure located on a side of a pathway.

The relative position and orientation estimation unit 108 determines a deviation from the predetermined path (ideal navigation path) based on the distance (d) as explained further along with FIG. 3B. FIG. 3B illustrates a process of determining a deviation of the entity from the predetermined path during navigation in the navigation space, in accordance with an embodiment. As depicted in FIG. 3B, a width of the entity 200 is represented by "b" 306, a distance of the entity 200 from a left side wall 310 is represented by "d" 308. The relative position and orientation estimation unit 108 determines the deviation ($\Delta w$) 312 given by equation (8):

$$\Delta w = w/2 - (d + b/2) \quad (8)$$

where w/2 represents a distance between the left wall 310 and the predetermined path 304 and a distance between the predetermined bath and an assembly line-1 314 or assembly line-2 316 in a navigation space.

Figure 3C:
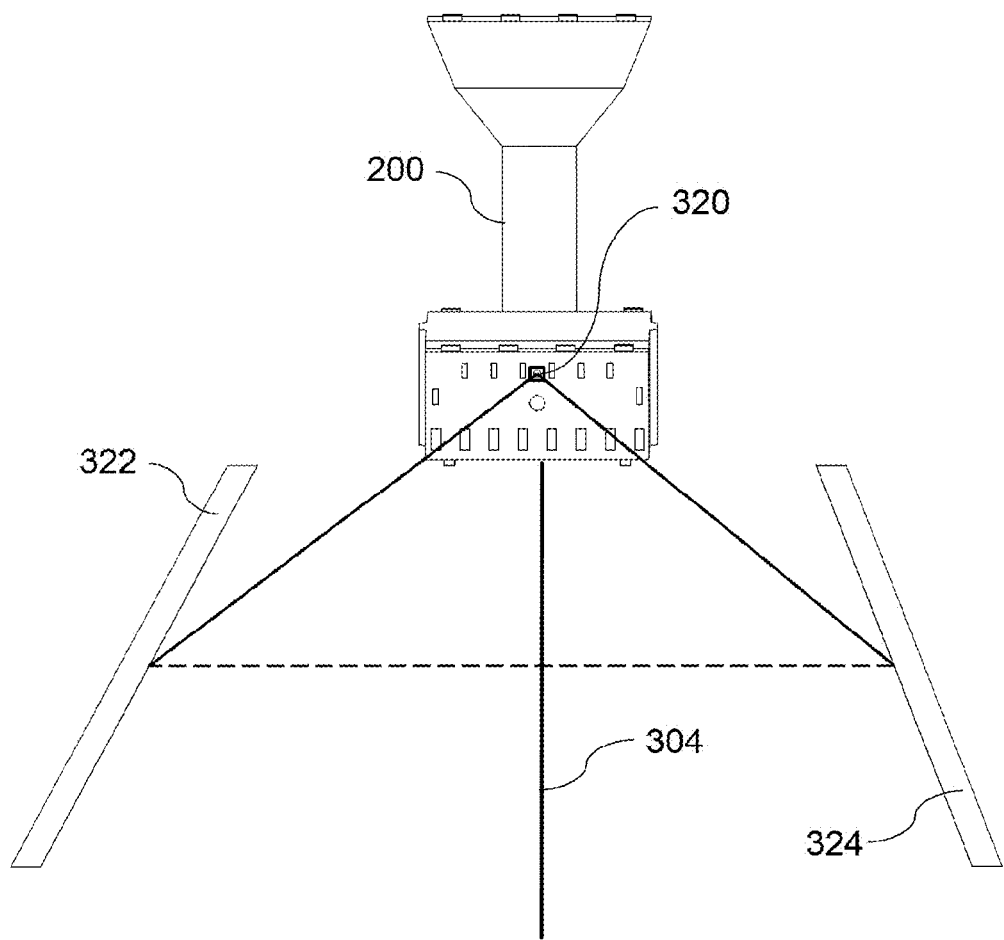
FIG. 3C illustrates a perspective view of an entity (robot) fitted with a system provided for determining a position and an orientation of an entity in a navigation space and fixed with a second set of sensors at the second plurality of locations on an example entity, and illustrates a determining of the relative position and relative orientation of the entity with respect to a pair of lane markings, according to one embodiment herein.

According to one embodiment herein, the relative position and orientation estimation unit 108 is configured to determine a relative position and/or a relative orientation of the entity 200 based on a sensor (for example, an image capturing device) from among the second set of sensors, positioned in front, back, and/or middle of the entity 200 by determining a relative position of the entity 200 inside a marked passage like a lane as depicted in FIG. 3C. Sensors 306A and 306B placed on the front side 206 and the rear side 204 respectively as shown in FIG. 3A represent one such embodiment.

FIG. 3C exemplarily illustrates determining the relative position and relative orientation of the entity 200, according to one embodiment herein. More particularly, FIG. 3C depicts a front perspective view of the entity 200 with a sensor (image capture device) 320 positioned on the front side of the entity 200. The entity navigates along the predetermined path 304. The sensor 320 captures the distance of the entity 200 relative to a pair of lane lines 322 and 324. The relative position and orientation estimation unit 108 determines a deviation Aw of the entity 200 from the predetermined path (or ideal path) 304 based on a distance from the middle of the entity (where sensor or image capture device is placed). The deviation Δw of the entity 200 is determined based on equation (8). Also, the difference in the angle of the lane lines as perceived by the sensor 320 enables the relative position and orientation estimation unit 108 to determine the relative orientation of the entity with respect to the lane lines.

According to one embodiment herein, the relative position and orientation estimation unit 108 determines the relative position and relative orientation of the entity 200 using a system that provides the depth information of the predetermined path 304. Using the depth information, the relative position and orientation estimation unit 108 draws virtual lanes and then the deviation from the predetermined path 304 is identified as explained along with FIGS. 3B-3C.

Figure 4A:
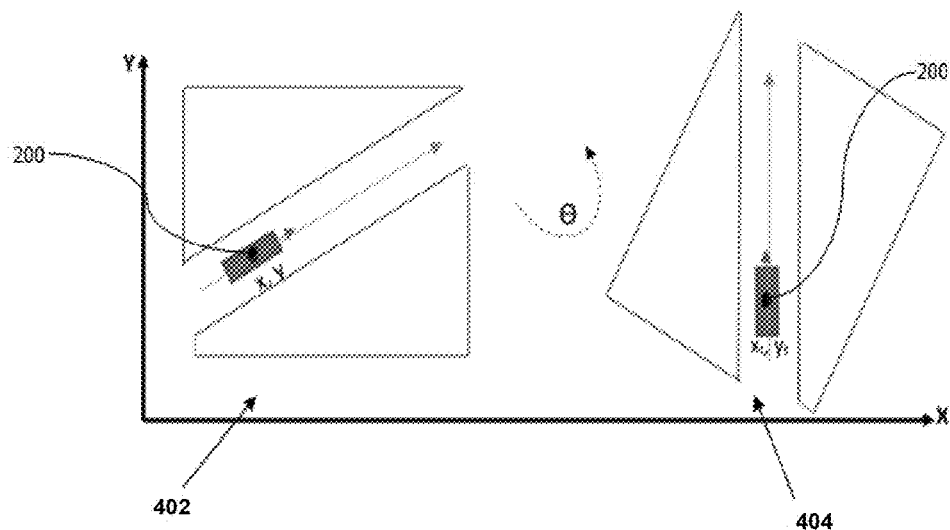
FIGS. 4A-4B illustrates a transformation of a navigation plane to align the predetermined path with Y-axis always using an analytics unit configured to transform the predetermined path by rotating a plane associated with the predetermined path by a known rotation angle so as to align the predetermined path parallel to one of X-axis or Y-axis of the two-dimensional cartesian plane to generate a transformed navigation plane, and for applying a refinement based on the relative position and the relative orientation in a system for determining a refined absolute position and a refined absolute orientation of an entity in a navigation space, according to one embodiment herein.
Figure 4B:
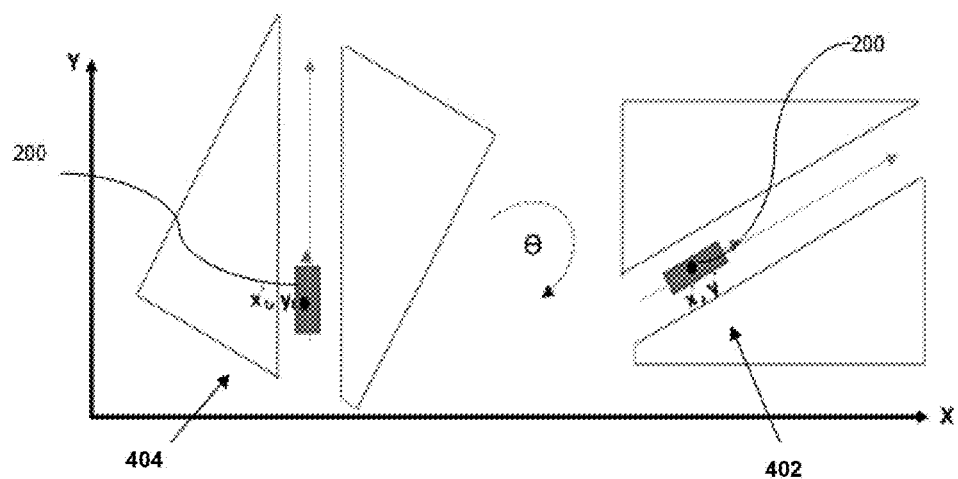

FIGS. 4A-4B depicts a transformation of a navigation plane 402 to align the predetermined path with Y-axis always as shown in the transformed navigation plane 404, according to one embodiment herein, wherein the coarse absolute position transforms to become transformed coarse absolute position of the entity. A floor alignment similar to FIG. 3B requires a simple step to augment a deviation of the entity 200 from the predetermined path, by refining only the Y value among the XY coordinates determined based on the transformed coarse absolute position. For a generic solution that eliminates the constraint on factory floor alignment with XY axes, the analytics unit 112 transforms the predetermined pathway (line segment) by means of plane rotation so as to always align it parallel to one of the axes, such as for example, Y axis. As depicted in FIG. 4A, if (x,y) is an absolute set of coordinates of the entity 200 provided by the coarse absolute position and orientation estimation unit 106, the analytics unit 112 rotates an initial plane 402 by Θ (angle between the direction of the entity and the Y-axis) to obtain a transformed plane 404 parallel to the Y axis, the transformed coordinates of the entity 200 in a transformed plane 404 would be $(x_t, y_t)$, where $x_t$ is given by equation (9):

$$x_t = x^*\cos(\Theta) + y^*\sin(\Theta); \quad y_t = -x^*\sin(\Theta) + y^*\cos(\Theta) \qquad (9)$$

As deviation from the predetermined (ideal) path in the transformed plane 404 is a simple refinement only to $x_t$, the analytics unit 112 applies the refinement based on the instantaneous relative position of the entity 200 received from the relative position and orientation estimation unit 108 to get the coordinates $(x'_t, y_t)$. Given, $(x_i, y_i)$ the start coordinates in the predetermined path, the transformed x, value $x_t^i$ is given by equation (10):

$$x_t^i = x^{i*}\cos(\Theta) + y^{i*}\sin(\Theta) \qquad (10)$$

After transformation, the predetermined (ideal) path would be parallel to the Y-axis and all values in the predetermined path will have same value $x_t^i$. The analytics unit 112 applies refinement to x, based on the instantaneous relative position of the entity 200 received from the relative position and orientation estimation unit 108 to obtain $x'_t$, given by equation (11):

$$x'_t = x_t^i - \Delta w \qquad (11)$$

upon the wall being on the right side of a direction of navigation of the entity 200, then $x'_t$ is given by equation (12):

$$x'_t = x_t^i + \Delta w \qquad (12)$$

upon the wall being on the left side of a direction of navigation of the entity 200, where Δw is the deviation of the entity with respect to the pre-determined path 304 derived in equation (8) (explained further with FIG. 3B), where, $x_t^i$ is the transformed 'x' value of the start coordinate in the ideal path, w is the width of the path, d is the relative distance reported by the plurality of sensors from the side of the entity 200 to the wall, and b is the width of the entity 200.

According to one embodiment herein, the analytics unit 112 rotates the plane back to the original orientation of the navigation plane 402 after rotation and translation in order to obtain $(x'_t, y_t)$, as depicted in FIG. 4B. The analytics unit 112 obtains the refined absolute position of the entity 200 (x', y') in the navigation plane 402 given by equation (13):

$$x' = x'_t{}^*\cos(\Theta) - y_t\sin(\Theta); \quad y' = x'_t{}^*\sin(\Theta) + y_t\cos(\Theta) \qquad (13)$$

The refined absolute coordinates (x', y') provides precise absolute position of the entity 200 with respect to the predetermined path 304 with a maximum error of, for example 10 cm.

According to one embodiment herein, the analytics unit 112 derives the absolute orientation of the entity using the relative orientation of the entity provided by the relative position and orientation estimation unit 108. As the transformed path in 404 is parallel to Y axis, the orientation of the transformed path is 90°. By refining the absolute orientation of the transformed path shown in 404 using the relative orientation of the entity followed by rotation of the plane back to the original orientation of the navigation plane 402, the absolute orientation of the entity in the navigation plane 402 is obtained. A weighted combination of this absolute orientation and the coarse absolute orientation provided by the coarse absolute position and orientation estimation unit (106) provides the final refined absolute orientation of the entity as derived by the analytics unit (112). The weightages are decided based on the accuracy offered by the specific relative input from the relative position and orientation estimation unit 108 and the coarse absolute position and orientation estimation unit (106).

Figure 5:
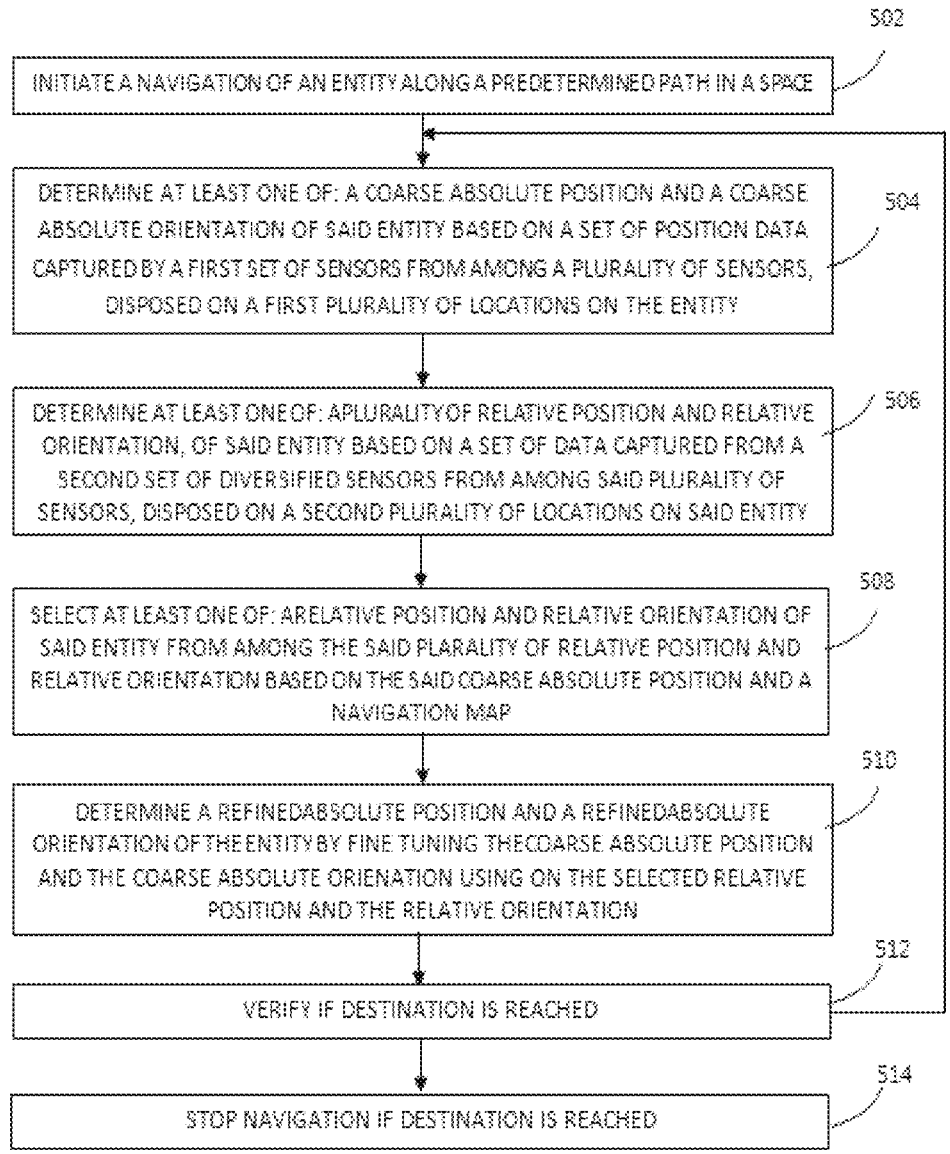
FIG. 5 is a flow chart explaining a process of navigating an entity along a predetermined path in a navigation space, using the system for determining a refined absolute position and a refined absolute orientation of an entity in a navigation space, according to one embodiment herein.

FIG. 5 is a flow diagram illustrating a process of find the refined absolute position and refined absolute orientation of an entity at a predetermined frequency/interval to facilitate navigation of the entity 200 along a predetermined path in a navigation space, using the system 102 of FIG. 1, according to one embodiment herein. At step 502, a navigation of the entity is initiated along the predetermined path in the navigation space. At step 504, at least one of: a coarse absolute position and a coarse absolute orientation of the entity is determined based on a position data captured by a first set of sensors from among a plurality of sensors, disposed on a first plurality of locations on the entity. At step 506, at least one of: a plurality of relative position and a relative orientation, of the entity is determined with respect to the predetermined path based on a set of data captured from a second set of diversified sensors from among the plurality of sensors, disposed on a second plurality of locations on the entity. At step 508, selecting at least one of: a relative position and relative orientation of the entity with respect to the predetermined path from among the plurality of relative position and relative orientation based on the coarse absolute position and a navigation map. At step 510, a refined absolute position and a refined absolute orientation of the entity is determined by fine tuning: the coarse absolute position based on relative position and the coarse absolute orientation based on relative orientation using an navigation map, wherein the navigation map is generated based on a map data and a machine learning model based on a historical navigation data. At step 512, it is verified if the destination is reached. Upon reaching the destination, at step 514, the navigation is stopped. Upon not reaching the destination steps 504 to 512 are repeated.

Figure 6:
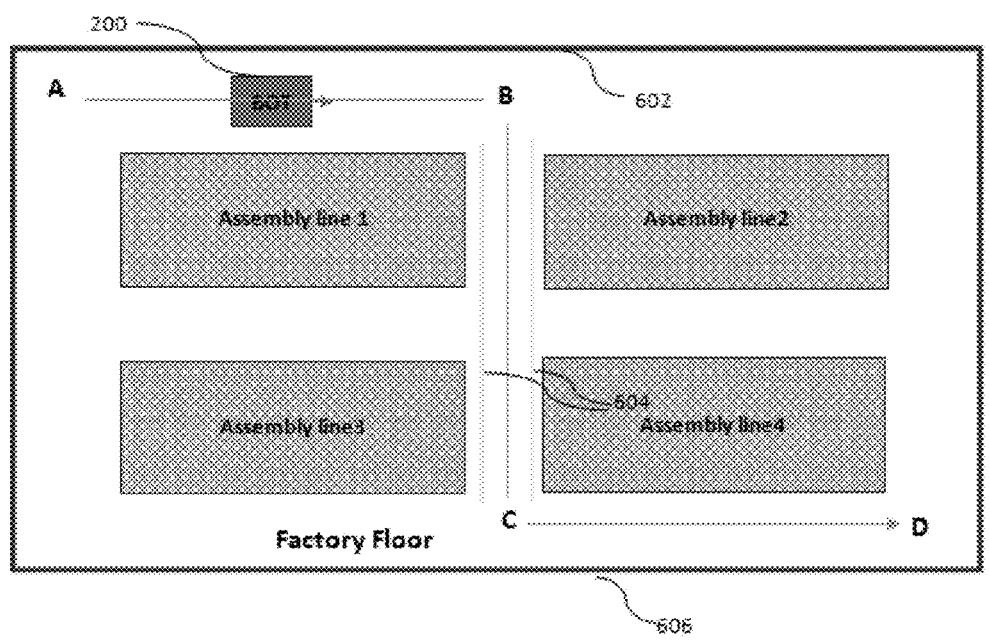
FIG. 6 illustrates a scenario when the entity navigates through various sections of the navigation space while using relative position offered by each section, either walls or the lanes, based on the choice of respective sensors, according to one embodiment herein.

FIG. 6 represents a typical navigation scenario wherein the entity moves across various sections of the navigation space as it traverses from point A to D, according to one embodiment herein. During the course of navigation, for each section, relative position of the entity is obtained based on the context and the attributes offered by the respective section of the layout and provided by the navigation map. For example, when the entity navigates through section AB, the relative position is obtained with respect to the adjacent wall on the left side (602). Between point B and C, the lane markings (604) offer a representation of the relative position of the entity with respect to the lane lines. Again, to navigate through section CD, the adjacent wall on the right side (606) is used to find the relative position of the entity. Seamless switch-over between sensors during navigation based on the context of the given navigation section is supported by the navigation map.

Figure 7:
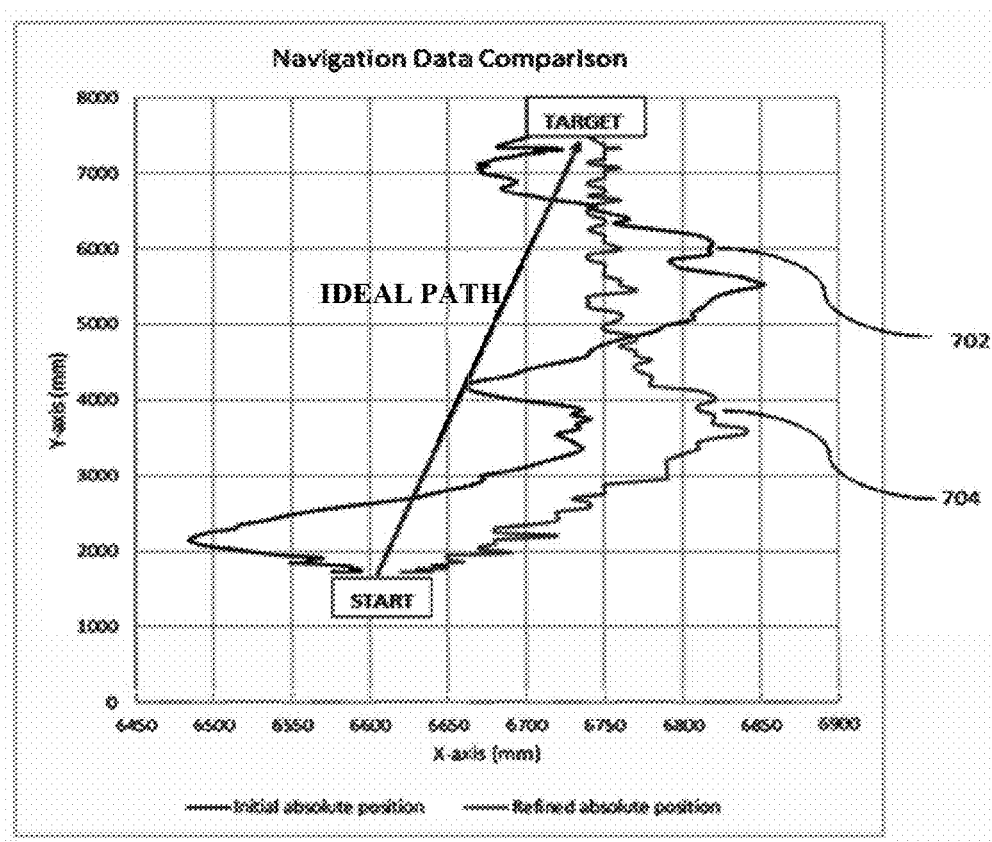
FIG. 7 illustrates the reliability of the refined absolute position offered by the present invention during a typical navigation between two points, according to one embodiment herein.

FIG. 7 shows the improvements offered by the present invention with refined representation of the absolute position and orientation of the entity that enhances the ability of the entity to navigate reliably and reach the target successfully, according to one embodiment herein. The comparison of the trajectory, for a given navigation, between the refined absolute position (704) and the coarse absolute position (702) clearly demonstrates the consistency in the trajectory offered by the present invention.

Figure 8:
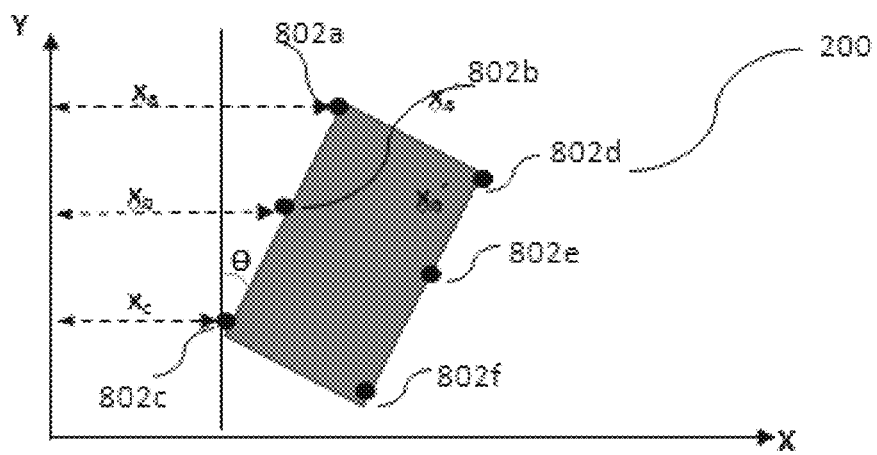
FIG. 8 illustrates an embodiment to find the relative orientation of the entity using proximity sensing devices that form part of the second set of diversified sensors, according to one embodiment herein Although the specific features of the embodiments herein are shown in some drawings and not in others. This is done for convenience only as each feature may be combined with any or all of the other features in accordance with the embodiments herein.

FIG. 8 illustrates an embodiment to find the relative orientation of the entity using proximity sensing devices that form part of the second set of diversified sensors, according to one embodiment herein. According to the embodiment, explained further along with FIGS. 4A-4B, the navigation plane 402 is rotated so as to align the predetermined path parallel to the Y-axis. In this transformed plane 404, using the distance measure provided by the proximity sensors 802a-c, slope of the straight line connecting 802a-c can be obtained in the transformed plane 404. By rotating the entity back to the navigation plane 402, the slope of the straight line undergoes similar rotation. The revised slope of this line gives a measure of an interim representation of the absolute orientation of the entity in the navigation plane 402, wherein the refined absolute orientation of the entity (200) is obtained as a weighted combination of the coarse absolute orientation and the interim representation of the absolute orientation of the entity.

The various embodiments of system and process of navigating an entity along a predetermined path in a navigation space disclosed herein facilitate an instantaneous accurate representation of absolute position using a combination of absolute positioning system, one such embodiment being wireless technology (local positioning system), and embodiments of relative sensor data. The present technology does not need to refer to any historical data, either short term or long term, to determine the position, there is no need for a training phase to generate any template for future comparison. Additionally, since in the present technology the data from multiple sensors are captured simultaneously to arrive at instantaneous absolute position representation, with no reference to any historical data, quality of the absolute position remains the same and does not degrade during any interval of time due to dependency on recency of old data and also the absolute position does not depend on any fixed references on the floor. Thus, the vulnerability associated with dynamic changes in the location of the fixed references is completely avoided. Planned changes like introduction of a new navigation path, demolition of an existing wall, construction of a new wall and the like would anyway get updated in the unique floor map maintained for the location. Moreover, the present technology provides a cost-effective system and process that provides good accuracy along with eliminating the dependency on any dynamically changing scenario on the floor unless it is a planned change like change in the navigation path, modifying the layout like breaking a wall, and the like.

Additionally, the present technology enables determining a refined absolute position and refined absolute orientation of an entity in a navigation space that achieves accurate absolute position using coarse absolute position and a unique combination of relative positions extracted from diversified sensors using specific features in the navigation space. The present technology also enables a seamless switch-over between sensors during navigation based on the context as supported by a unique navigation map providing better accuracy compared to existing techniques. The present technology enables navigation of an entity reliably using the refined absolute position and refined absolute orientation of the entity thus minimizing the deviation from ideal path and reaching the target faithfully.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications.

We claim:

1. A system (102) for determining an instantaneous absolute position and absolute orientation of an entity in a navigation space, the system comprising:
a plurality of sensors (104) comprising a first set of sensors disposed on a first plurality of locations on the entity (200), wherein the first set of sensors are part of a cartesian coordinate system provided by a local positioning system formed using a technology selected from a group consisting of UWB, Bluetooth, Zig-bee, Ultrasound, and a second set of diversified sensors disposed on a second plurality of locations on the entity (200);
a coarse absolute position and orientation estimation unit (106) configured to determine at least one of: a coarse absolute position and a coarse absolute orientation, of the entity (200) based on a position data captured in a two-dimensional cartesian plane of the cartesian coordinate system at a predetermined frequency/interval by the first set of sensors (304);
a relative position and orientation estimation unit (108) configured to determine at least one of: a relative position and a relative orientation, of the entity (200) with respect to the predetermined path (304) based on a set of data captured at a predetermined frequency/interval from the second set of diversified sensors wherein the data captured represent one of a relative deviation and a relative inclination of the entity with respect to one of the predetermined physical features in the navigation space;

a navigation guidance unit (110) configured to generate a navigation map that provides unique attributes based on a desired navigable layout identified in the indoor navigation space and to update one or more of the attributes of the navigation map dynamically as a learning/feedback based on a historical navigation data wherein the navigation guidance unit (110) is positioned inside the entity (200) or outside the entity; and an analytics unit (112) configured to determine at least one of a refined absolute position and a refined absolute orientation of the entity (200) at a predetermined frequency/interval by fine tuning: the coarse absolute position and the coarse absolute orientation based on 1) one or more of the plurality of inputs provided by the relative position and orientation estimation unit (108), 2) coarse absolute position of the entity and 3) the unique attributes provided by the navigation guidance unit (110);

wherein the entity (200) comprises a stationary object or a mobile object.

2. The system (102) as claimed in claim 1, wherein the analytics unit (112) is configured to:

transform the predetermined path (304) by rotating a navigation plane associated with the predetermined path (304) by a rotation angle so as to align the predetermined path (304) parallel to one of X-axis or Y-axis of the two-dimensional cartesian plane and to generate a transformed navigation plane (404) wherein the coarse absolute position undergoes same rotation to become transformed coarse absolute position of the entity;

apply a refinement to the transformed coarse absolute position based on one or more of the plurality of inputs from the relative position and orientation estimation unit to obtain a transformed refined absolute position of the entity (200) on the transformed navigation plane (404), wherein the refinement is a simple substitution of a combination of a transformed ideal coordinate value of interest and one or more of the plurality of deviations from the predetermined path obtained from among the plurality of inputs from the relative position and orientation estimation unit (108), to either X or Y value of the transformed coarse absolute position coordinates of the entity (200) depending up on the rotation applied during transformation of the plane, and wherein the transformed ideal coordinate value of interest is equal to one of the transformed ideal starting point coordinate values selected based on the transformation applied, and wherein, the transformed ideal coordinate value of interest is equal to X coordinate value for a transformed predetermined path aligned parallel to the Y-axis of the cartesian plane and vice versa, and wherein the ideal starting point is the theoretical coordinates for the starting node in the line segment obtained from the navigation map; and obtaining a refined absolute position of the entity (200) by rotating the transformed navigation plane (404) in the reverse direction by same quantity which is equal to the rotation angle back to the original orientation of the navigation plane (402), and wherein the transformed refined absolute position is rotated by the same angle to provide the refined absolute position of the entity (200).

3. The system (102) as claimed in claim 1, wherein the analytics unit (112) is configured to:

derive the refined absolute orientation of the entity based on 1) the relative orientation of the entity obtained from the relative position and orientation estimation unit (108) and 2) the coarse absolute orientation obtained from the coarse absolute position and orientation estimation unit (104);

wherein the relative orientation of the entity with respect to the predetermined path (304) provided by the relative position and orientation estimation unit (108) along with its sign of orientation is added to the orientation of the predetermined path in the transformed navigation plane 404 to obtain the transformed absolute orientation of the entity in the transformed navigation plane 404;

wherein the orientation of the predetermined path in the transformed plane 404 is either the same as X-axis or Y-axis based on the transformation applied;

wherein by rotating the plane 404, in the reverse direction by same quantity as the rotation angle, back to the original orientation of the navigation plane 402, the transformed absolute orientation angle undergoes similar rotation and provides an interim representation of the absolute orientation of the entity (200).

wherein the refined absolute orientation of the entity (200) is obtained as a weighted combination of the coarse absolute orientation and the interim representation of the absolute orientation of the entity.

4. The system (102) as claimed in claim 1, wherein the analytics unit (112) is configured to select and use one or more of the relative positions and the relative orientation from the relative position and orientation estimation unit from among a plurality of inputs, and wherein such plurality of inputs to the analytics unit is derived by the relative position and orientation unit using the diversified set of sensors among the second set of sensors. The choice of the specific input to be used is guided by the navigation map based on the coarse absolute position of the entity (200).

5. The system (102) as claimed in claim 1, wherein the analytics unit (112) is configured to seamlessly select the relative position and the relative orientation from among a plurality of inputs from the relative position and orientation estimation unit while navigating through a plurality of mutually different sections of a navigation layout involving either a plurality of line segments or a single line segment with mutually different physical attributes, and wherein the selection is guided by the navigation map based on the coarse absolute position of the entity (200), and wherein the navigation map provides the physical attributes associated with each such line segment wherein the physical attribute is a wall adjacent to the navigation path along with its side, or a presence of lane marking.

6. The system (102) as claimed in claim 1, wherein the first plurality of locations on the entity (200) comprises a front end and a rear end of the entity (200), and wherein the second plurality of locations selected from a group consisting of a left side of the entity (200), a right side of the entity (200), a front end of the entity (200) and a back end of the entity (200).

7. The apparatus (102) as claimed in claim 1, wherein the second plurality of sensors comprises proximity sensing devices, and image capture devices, and wherein upon using such diversified set of sensors, the relative position and orientation estimation unit (108) provides a plurality of inputs to the analytics unit (112) representing a relative position and an relative orientation of the entity (200)

relative to the predetermined path (304) derived based on a set of data captured at a predetermined frequency/interval from the second set of diversified sensors, and wherein the data captured represent one of: a relative deviation and a relative inclination of the entity with respect to certain known fixed physical features in the navigation space and wherein the relative position and orientation estimation unit (108) derives a plurality of such relative position and relative orientation based on the diversified set of data captured from the second set of diversified sensors.

8. A method to provide one of a refined absolute position and a refined absolute orientation of an entity at predefined frequency/interval to facilitate navigation of the entity along a predetermined path in a navigation space, the process comprising steps of:
 a) initiating (502) navigation of the entity along the predetermined path in the space;
 b) determining (504) at least one of: a coarse absolute position and a coarse absolute orientation of the entity based on a set of position data captured by a first set of sensors from among a plurality of sensors, disposed on a first plurality of locations on the entity;
 c) determining (506) at least one of: a plurality of relative position and relative orientation, of the entity with respect to the predetermined path based on a set of data captured from a second set of diversified sensors from among the plurality of sensors, disposed on a second plurality of locations on the entity;
 d) selecting (508) at least one of: a relative position and relative orientation of the entity with respect to the predetermined path from among the plurality of relative position and relative orientation based on the coarse absolute position and a navigation map
 e) determining (510) a refined absolute position and a refined absolute orientation of the entity by fine tuning: the coarse absolute position based on selected relative position, and the coarse absolute orientation based on selected relative orientation, using a navigation map, wherein the navigation map is generated and updated based on a map data and a machine learning model based on a historical navigation data;
 f) verifying (512) if the destination is reached; and
 g) performing any one of:
  i) repeating steps b) to f) upon the destination not being reached; and
  ii) stopping (514) navigation of the entity upon destination being reached.

9. The method as claimed in claim 8, comprises selecting the relative position and the relative orientation from among a plurality of inputs from the relative position and orientation estimation unit, and wherein the plurality of inputs is derived by the relative position and orientation unit using the diversified set of sensors among the second set of sensors, and wherein the specific input to be used is selected by the navigation map based on the coarse absolute position of the entity.

10. The method as claimed in claim 8, comprises seamlessly selecting and using the relative position and the relative orientation from a plurality of inputs from the relative position and orientation estimation unit while navigating through different sections of a navigation layout comprising a plurality of line segments or a single line segment with mutually different physical attributes, and wherein the selection is guided by the navigation map based on the coarse absolute position of the entity, and wherein the navigation map provides the physical attributes associated with each such line segment, and wherein the physical attribute is selected from a group consisting of a wall adjacent to the navigation path along with its side, and a presence of lane marking.

* * * * *